(12) United States Patent
Haase et al.

(10) Patent No.: US 11,520,296 B2
(45) Date of Patent: Dec. 6, 2022

(54) TIME-TO-DIGITAL CONVERTER ARRANGEMENT

(71) Applicant: Fraunhofer-Gesellschaft zur Förderung der angewandten Forschung e.V., Munich (DE)

(72) Inventors: Jan Haase, Duisburg (DE); Olaf Schrey, Duisburg (DE); Maik Beer, Duisburg (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 16/847,797

(22) Filed: Apr. 14, 2020

(65) Prior Publication Data
US 2020/0333750 A1    Oct. 22, 2020

(30) Foreign Application Priority Data
Apr. 18, 2019 (DE) .......................... 102019205731.4

(51) Int. Cl.
*G04F 10/00* (2006.01)
*G01J 1/44* (2006.01)

(52) U.S. Cl.
CPC .............. *G04F 10/005* (2013.01); *G01J 1/44* (2013.01)

(58) Field of Classification Search
CPC ................................ G04F 10/005; G01J 1/44
USPC .................................................... 250/214 DC
See application file for complete search history.

(56) References Cited

U.S. PATENT DOCUMENTS

| | | | |
|---|---|---|---|
| 5,075,878 A | 12/1991 | Ohtomo et al. | |
| 7,653,500 B2 | 1/2010 | Kobayashi | |
| 8,243,555 B2 | 1/2012 | Henzler et al. | |
| 8,839,110 B2 * | 9/2014 | Wang | G11B 27/034 715/723 |
| 9,477,207 B2 | 10/2016 | Song et al. | |
| 2005/0122846 A1 | 6/2005 | Bolli et al. | |

(Continued)

FOREIGN PATENT DOCUMENTS

| | | |
|---|---|---|
| CN | 101277104 A | 10/2008 |
| CN | 102449503 A | 5/2012 |

(Continued)

OTHER PUBLICATIONS

Chinese language office action dated Apr. 2, 2021, issued in application No. CN 202010307400.2.

(Continued)

*Primary Examiner* — Kevin K Pyo
*Assistant Examiner* — Don J Williams
(74) *Attorney, Agent, or Firm* — McClure, Qualey & Rodack, LLP (57) ABSTRACT

Time-to-digital converter arrangement having a first and a second time-to-digital converters. The first one is configured to determine the existence or nonexistence of an event in a recurring first measurement window. The second one is configured to determine the existence or nonexistence of the event in a recurring second measurement window. A temporal relation of the second measurement window with respect to detecting the event is time-shifted by a first offset compared to a temporal relation of the first measurement window with respect to detecting the event.

20 Claims, 6 Drawing Sheets

(56) References Cited

U.S. PATENT DOCUMENTS

| | | |
|---|---|---|
| 2008/0129574 A1 | 6/2008 | Choi et al. |
| 2008/0238652 A1 | 10/2008 | Henzler et al. |
| 2009/0219073 A1 | 9/2009 | Sun et al. |
| 2012/0068077 A1 | 3/2012 | Frach et al. |
| 2012/0210232 A1 | 8/2012 | Wang et al. |
| 2014/0247078 A1 | 9/2014 | Mann |
| 2015/0041625 A1* | 2/2015 | Dutton .................... G01S 17/10 250/208.1 |
| 2015/0054667 A1 | 2/2015 | Chien |
| 2017/0329284 A1 | 11/2017 | Wu et al. |
| 2017/0366330 A1* | 12/2017 | Chan .................... H04L 7/0331 |
| 2018/0088536 A1 | 3/2018 | Kurashina et al. |
| 2018/0123611 A1* | 5/2018 | Dutton .................. G01S 7/4863 |
| 2019/0155223 A1* | 5/2019 | Drader .................. G04F 10/005 |
| 2020/0333750 A1 | 10/2020 | Haase et al. |

FOREIGN PATENT DOCUMENTS

| | | |
|---|---|---|
| CN | 102495912 A | 6/2012 |
| CN | 103616813 A | 3/2014 |
| CN | 104614976 A | 5/2015 |
| CN | 105159083 A | 12/2015 |
| CN | 205080373 U | 3/2016 |
| CN | 105763196 A | 7/2016 |
| CN | 106527098 A | 3/2017 |
| CN | 106773613 A | 5/2017 |
| CN | 107077099 A | 8/2017 |
| CN | 107870559 A | 4/2018 |
| CN | 109141213 A | 1/2019 |
| CN | 111830815 A | 10/2020 |
| EP | 0 353 890 A2 | 2/1990 |
| EP | 2 269 312 A1 | 1/2011 |
| EP | 2269312 A1 | 1/2011 |
| JP | H02-77673 A | 3/1990 |
| JP | 2005-106826 A | 4/2005 |
| WO | 03/088485 A1 | 10/2003 |
| WO | WO-2010136910 A2 * | 12/2010 ........... G01T 1/2985 |
| WO | 2014/173050 A1 | 10/2014 |
| WO | 2018/050798 A1 | 3/2018 |

OTHER PUBLICATIONS

English language translation of Chinese office action dated Apr. 2, 2021, issued in application No. CN 202010307400.2.

P. Seitz and A. J. P. Theuwissen, Eds., "Single-photon imaging". Heidelberg; New York: Springer, 2011.

M. M. Hayat, S. N. Torres, and L. M. Pedrotti, "Theory of photon coincidence statistics in photon-correlated beams," Opt. Commun., vol. 169, No. 1-6, pp. 275-287, Oct. 1999.

M. Beer, O. M. Schrey, B. J. Hosticka, and R. Kokozinski, "Coincidence in SPAD-based time-of-flight sensors," in 2017 13th Conference on Ph.D. Research in Microelectronics and Electronics (PRIME), 2017, pp. 381-384.

Chen, P; et al.:—"A 2.5-ps Bin Size and 6.7-ps Resolution FPGA Time-to-Digital Converter Based on Delay Wrapping and Averaging". In: IEEE Transactions on Very Large Scale Integration (VLSI) Systems, vol. 25, No. 1. pp. 114-124, Jan. 2017.—ISSN 1557-9999.

Ozawa, Y.; et al.: "SAR TDC Architecture with Self-Calibration Employing Trigger Circuit". In: 2017 IEEE 26th Asian Test Symposium (ATS), Taipei, 2017, pp. 90-95.—ISSN: 2377-5386.

Chinese language office action dated Jun. 23, 2022, issued in application No. CN 202010307400.2.

English language translation of office action dated Jun. 23, 2022, issued in application No. CN 202010307400.2 (pp. 1-7 of attachment).

Chinese language office action dated Jan. 19, 2022, issued in application No. CN 202010307400.2.

English language translation of office action dated Jan. 19, 2022, issued in application No. CN 202010307400.2 (pp. 1-9 of attachment).

* cited by examiner

TIME-TO-DIGITAL CONVERTER ARRANGEMENT

CROSS-REFERENCE TO RELATED APPLICATIONS

This application claims priority from German Patent Application No. 102019205731.4, which was filed on Apr. 18, 2019, and is incorporated herein in its entirety by reference.

Embodiments of the present invention relate to a time-to-digital converter arrangement, a method for time-to-digital conversion as well as to a computer program.

BACKGROUND OF THE INVENTION

Time-to-digital converters (TOG) are used for determining a runtime, such as a signal runtime for distance measurements. For this purpose, for example, CMOS image sensor technology is used.

CMOS image sensor technology offers effective options of capturing measurement signals at high velocity in realtime. This is very useful for capturing three-dimensional (3D) distance images in time critical systems. Pulse runtime methods and methods with continuously modulated light serve for contactless depth detection. For this, the runtime of the laser light emitted by an active radiation source and reflected by a target object is measured by detecting the residual intensity. In this context, this is called light detection and ranging (LIDAR). The focus of the method for distance measurement presented herein based on known methods is on improving the measurement accuracy. Processes and regulations for realizing an optimum adaptation will be described. Possible fields of application are:

- Advance the driver assistance systems (ADAS)
- Autonomous driving
- Safety monitoring
- Avionics
- Medical technology Exact determination of distances is essential in many fields of application. Particularly in the fled of industrial measurement and positioning technology, the distances to machines or goods have to be determined with very high precision to allow processes that are as efficient and space-saving as possible. For example, when storing goods in an automated high-rack storage, the storage spaces should only be slightly bigger than the goods to be stored in order to obtain optimum use of space. For this, it is crucial that the position of the goods is detected with very high accuracy by the responsible measurement system.

Single photon avalanche diodes (SPAD) are avalanche photodiodes operated via their breakdown voltage. In this so-called Geiger region, a single photon which is absorbed in the active region of the diode and generates a free charge carrier is already sufficient to cause a breakdown of the diode and, hence, a macroscopic current flow through the diode. Therefore, SPADs allow the detection of individual photons. Existing SPAD-based 3D sensors are based on different principles. In the direct method considered herein, the runtime of a laser pulse from the emission via the reflection at the target object up to the detection in the sensor is detected by means of an electronic timer (e.g. time-to-digital converter, TDC). Here, time measurement is started with the emission of a short laser pulse and stopped with the reception of the reflected pulse [1]. Stopping the time measurement is performed in the first photon method with the first event detected by the sensor after the start. In the ideal case, the measured time corresponds to the light runtime and can be converted directly into the distance between sensor and target object by $d=cl/2$. The TDC indicates the temporal and, hence, also the possible spatial resolution. Thus, for improving the resolution production of an increasingly accurate TDC is needed.

However, the temporal resolution of a time-to-digital converter is limited to a certain bottom limit due to the circuit-technological implementation as well as the physical process limits. Therefore, there is a need for an improved approach.

SUMMARY

According to an embodiment a time-to-digital converter arrangement may have: a first time-to-digital converter configured to determine an existence or nonexistence or an event in a recurring first measurement window; a second time-to-digital converter configured to determine the existence or the nonexistence of the event in a recurring second measurement window, wherein a temporal relation of the second measurement window with respect to detecting the event is time-shifted by a first offset compared to a temporal relation of the first measurement window with respect to detecting the event.

According to another embodiment, a time-to-digital converter arrangement may have: a first time-to-digital converter configured to determine an existence or nonexistence of an event for a first frame in a recurring first measurement window and an existence or nonexistence of the respective event for at least a second frame in a recurring second measurement window; wherein a temporal relation of the second measurement window with respect to detecting the respective event is time-shifted by a first offset compared to a temporal relation of the first measurement window with respect to detecting the event.

According to another embodiment, a measurement system may have; a time-to-digital converter arrangement, having: a first time-to-digital converter configured to determine an existence or nonexistence of an event in a recurring first measurement window; a second time-to-digital converter configured to determine the existence or the nonexistence of the event in a recurring second measurement window, wherein a temporal relation of the second measurement window with respect to detecting the event is time-shifted by a first offset compared to a temporal relation of the first measurement window with respect to detecting the event, as well as a CMOS sensor, a silicon photo multiplier, an avalanche diode or another detector for detecting an event.

According to another embodiment, a method for time-to-digital conversion may have the steps of: determining an existence or nonexistence of an event associated to a recurring first measurement window by means of a first time-to-digital converter; determining the existence or nonexistence of the event associated to a second recurring measurement window by means of a second time-to-digital converter, wherein a temporal relation of the second measurement window with respect to detecting the event is time-shifted by a first offset compared to a temporal relation of the first measurement window with respect to detecting the event.

According to another embodiment, a method for time-to-digital conversion may have the steps of: determining, by means of a first time-to-digital converter, an existence or nonexistence of en event for a first frame in a recurring first measurement window; and determining, by means of a first time-to-digital converter, an existence or nonexistence of the respective event for at least a second frame in a recurring second measurement window; wherein a temporal relation of the second measurement window with respect to detecting the respective event is time-shifted by a first offset compared to a temporal relation of the first measurement window with respect to detecting the event.

Another embodiment may have a non-transitory digital storage medium having a computer program stored thereon to perform any of the inventive methods when said computer program is run by a computer.

Embodiments of the present invention provide a time-to-digital converter arrangement comprising a first time-to-digital converter as well as at least one second time-to-digital converter. The first time-to-digital converter is configured to determine, in a recurring first measurement window (or in several recurring first measurement windows associated to the first time-to-digital converter), an existence or nonexistence of the event. The second time-to-digital converter is configured to determine, in a recurring first measurement window (or in several recurring first measurement windows associated to the first time-to-digital converter), an existence or nonexistence of the event. Here, a temporal relation of the second measurement window with respect to detecting the event is time-shifted by a first offset compared to a temporal relation of the first measurement window with respect to detecting the event.

Embodiments of the present invention are based on knowledge that an improved temporal resolution of the measurement can be obtained by using several (identical) time-to-digital converters having time-shifted sampling points. Here, the time-to-digital converters are started or stopped in a time-shifted manner such that an exact temporal classification compared to a time-to-digital converter is possible by some sort of interpolation. The method allows to increase accuracy by n times with n time-to-digital converters running in parallel. This results in the following advantages: compared to conventional technology, the depth resolution significantly increases in that this method enables a higher temporal and, hence, spatial resolution. This is obtained by switching several already existing TDCs in parallel and there is no need to change to a faster TDC, e.g., a technology with small structural size. Therefore, it is possible to obtain a high temporal resolution without the TDC as component having to obtain the same.

Alternatively, a correlation between the runtimes of a time-to-digital converter of n successive frames with time-shifted sampling rates can be realized. Therefore, an embodiment provides a time-to-digital converter arrangement having at least one first time-to-digital converter. The same is configured to determine, in a recurring first measurement window (or in several recurring first measurement windows associated to the first frame), an existence or nonexistence of an event for a first frame, and in a recurring second measurement window (or in several recurring second measurement windows associated to the second frame), an existence or nonexistence of the respective event for at least a second frame. The temporal relation of the second measurement window with respect to detecting the respective events is time-shifted by a first offset compared to a temporal relation of the first measurement window with respect to detecting the event.

Therefore, this second aspect is also based on the knowledge that a higher temporal resolution can be obtained by a time-shift than it is obtainable by only a single time-to-digital converter. Here, however, not the one and same signal associated to one event is evaluated, but respective signals associated to the same events in frames successive in time. Thus, it should be noted that when n different time-to-digital converters are stated below, this is understood such that the temporal correlation of a time-to-digital converter is considered in successive frames. Here, it is assumed that the measured runtime does not or insignificantly change during the n frames.

In the following, further details, in particular with respect to the first aspect, will be discussed.

According to embodiments, the time-to-digital converter arrangement comprises at least a third time-to-digital converter configured to determine the existence or nonexistence of the event in a recurring third measurement window. Here, a temporal relation of the third measurement window with respect to detecting the event is time-shifted by a second offset compared to a temporal relation of the second measurement window with respect to detecting the event, and time-shifted by the first and the second offset compared to a temporal relation of the first measurement window with respect to detecting the event. According to embodiments, the first and the second offset or each offset can have the same length. According to further embodiments, the first and second measurement windows and/or the first, second and third measurement windows or generally all measurement windows have the same temporal duration (are of the same length).

According to further embodiments, the time-to-digital converter arrangement comprises one counter per time-to-digital converter. Here, the first and the second time-to-digital converter or each time-to-digital converter is connected to one counter each configured to count the number of time windows up to the existence or the no-longer-existence of the event per converter. According to further embodiments, the counter is configured to count the number of time windows between start and end (start of a signal runtime and end of a signal runtime or evaluating a signal and receiving a signal), wherein the end is defined by the existence or no longer existence of the event.

According to embodiments, the event, e.g., in form of a stop signal, is fed to each time-to-digital converter.

The arrangement or usage of the further time-to-digital converters is used for interpolation. Here, an interpolated measurement value is obtained when the number of counted measurement windows between the first and the second time-to-digital converter, between the second and the third time-to-digital converter or between increments of successively arranged time-to-digital converters is different. In that way, for example, the second or the third time-to-digital converter is used for interpolation. For example, interpolation takes place when the number of counted measurement windows between the first and the second time-to-digital converter is different. Alternatively, interpolation takes place when the number of measurement windows differs between the second and the third time-to-digital converter. According to embodiments, the time-to-digital converter arrangement can comprise a calculating unit configured to determine the runtime as follows: the number of measurement windows of the first converter multiplied with the duration per measurement window and addition of the first offset when the number of counted measurement windows between the first and the second time-to-digital converter is different or the number of measurement windows of the first time-to-digital converter multiplied with the duration per measurement window and addition of the first and the second offset when the number of the measurement windows of the third time-to-digital converter differs from the one of the second time-to-digital converter.

Essentially, there are two different approaches for obtaining the offset. According to a first approach, the second measurement window can be started shifted by the first offset with respect to the first measurement window. Based on the same length, both start as well as end of the measurement window of the second time-to-digital converter is delayed. For several time-to-digital converters, according to further embodiments, an incrementally shifted start takes place, namely shifted by the respective offset. According to embodiments, the runtime can then be calculated based on the following formula:

$$t = \left[m + \frac{k_{fine}}{n}\right] \cdot \Delta T_{TDC}$$

Here, m is the number of counted time windows up to the stop signal (e.g, counted by means of the first time-to-digital converter). n is the number of time-to-digital converters, is the number of counted fine steps (time windows until a time-to-digital converter counts a different number) and $\Delta T_{TDC}$ is the duration of a time window.

According to a second variation, the end, or to be more accurate, the stop signal can be delayed for the second or the subsequent time-to-digital converters. Here, the event is fed to the second time-to-digital converter shifted by the first offset (shifted with respect to feeding to the first time-to-digital converter). Analogously, feeding the event is shifted by a first and a second offset (compared to feeding to the first time-to-digital converter) when feeding to the third time-to-digital converter. According to embodiments, shifting is performed incrementally, i.e. by a further offset of additional time-to-digital converters. Here, basically, all time-to-digital converters and at least the first and the second time-to-digital converter are started simultaneously, wherein the stop signal is fed in a delayed manner to the second and subsequent time-to-digital converter. According to further embodiments the runtime can be calculated based on the following formula:

$$t = \left[m + 1 - \frac{k_{fine}}{n}\right] \cdot \Delta T_{TDC}.$$

Regarding the second aspect, it should be noted that, according to embodiments, the frames are sequential in time such that the second frame directly follows the first frame. According to further embodiments, this principle is obviously also applicable to a third frame. Here, the first time-to-digital converter is configured to determine, in a recurring third measurement window, an existence or nonexistence of a further respective event for at least a third frame.

Regarding both aspects, with such a time-to-digital converter arrangement, a measurement system including a respective arrangement as well as a receiver, for example a CMOS sensor, a silicon photomultiplier, avalanche diode or another detector for detecting an event can be provided.

Further embodiments provide a method for time-to-digital conversion. This method includes the following steps: determining an existence or nonexistence of an event associated to a recurring first measurement window by means of a first time-to-digital converter; determining the existence or the nonexistence of the event associated to a second recurring measurement window by means of a second time-to-digital converter, wherein a temporal relation of the second measurement window with respect to detecting the event is time-shifted by a first offset compared to a temporal relation of the first measurement window with respect to detecting the event. Here, a temporal relation of the second measurement window with respect to detecting the event is time-shifted by a first offset compared to a temporal relation of the first measurement window with respect to detecting the event.

A further method according to a further embodiment includes the following steps determining, by means of a first time-to-digital converter, an existence or nonexistence of an event for a first frame in a recurring first measurement window, and determining, by means of a first time-to-digital converter, an existence or nonexistence of the respective event for at least a second frame in a recurring second measurement window; wherein a temporal relation of the second measurement window with respect to detecting the respective event is time-shifted by a first offset compared to a temporal relation of the first measurement window with respect to detecting the event. Here, a temporal relation of the second measurement window with respect to detecting the respective event is time-shifted by a first offset compared to a temporal relation of the first measurement window with respect to detecting the event.

Obviously, both methods can also be performed in a computer-implemented manner, Therefore, a further embodiment provides a respective computer program.

BRIEF DESCRIPTION OF THE DRAWINGS

Embodiments of the present invention will be detailed subsequently referring to the appended drawings, in which.

DETAILED DESCRIPTION OF THE INVENTION

Before embodiments of the present invention will be discussed below with reference to the accompanying drawings, it should be noted that equal elements and structures are provided with the same reference numbers such that the description of the same is inter-applicable or inter-exchangeable.

Figure 1:
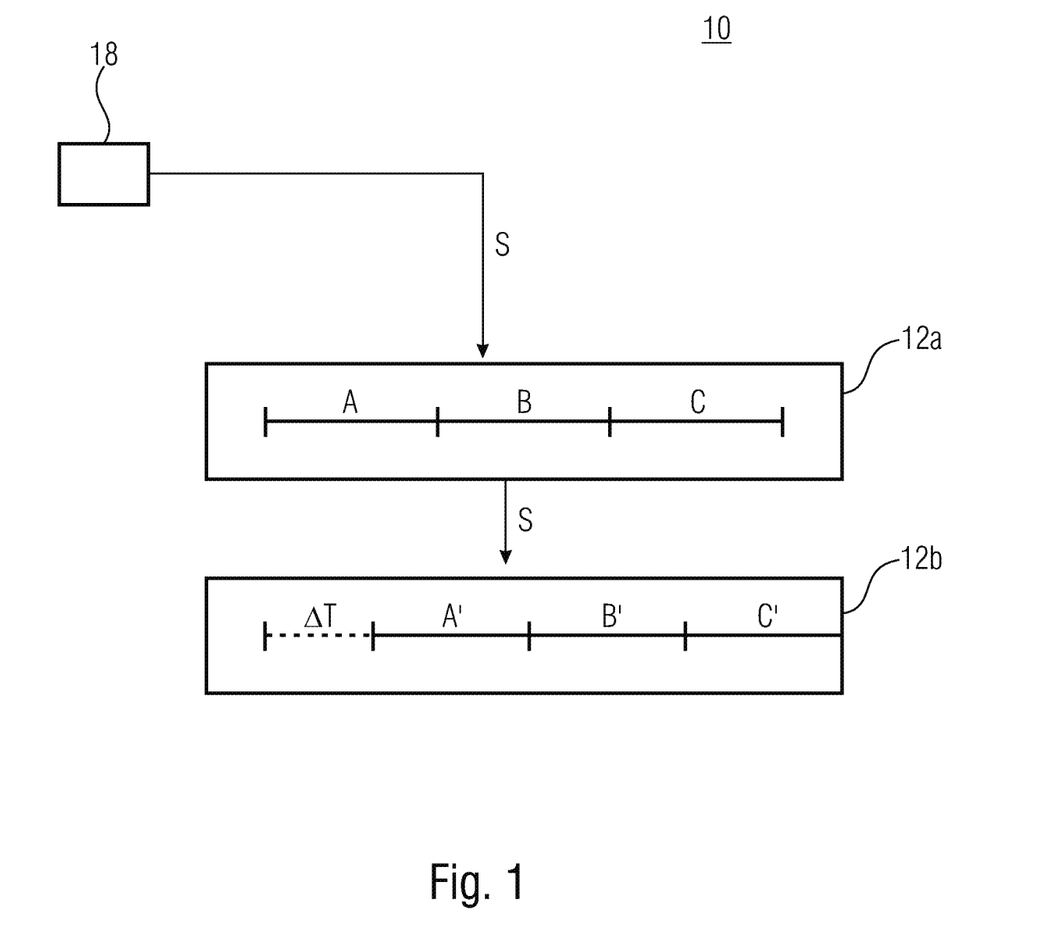
FIG. 1 is a schematic block circuit diagram of a time-to-digital converter arrangement according to a basic embodiment.

FIG. 1 shows a time-to-digital converter arrangement 10 having a first time-to-digital converter 12a, as well as a second time-to-digital converter 12b. Both can be essentially identical and can each have an internal clock. This clocking can, for example, be realized by a ring oscillator or the same. This clock is illustrated by the time windows A, B, C in the time-to-digital converter 12a and A', B' and C' in the time-to-digital converter 12b, respectively. Each of the time-to-digital converters 12a and 12b is configured to determine the respective time window A, B or C and A', B' and C', respectively, to which a respective signal S is fed. This can, for example, take place by a simple count or the like.

The signal S can, for example, be a light signal reflection signal or response signal received by means of a sensor 18, e.g. an avalanche diode. When it is assumed that the respective clock of the time-to-digital converter 12a or 12b is started when emitting an excitation signal, a time period between emitting the excitation signal and receiving the response signal S can be determined by counting or determining the respective clock. However, the temporal resolution is defined by the length $\Delta T_{TDC}$ (according to A or B or C or A' or B' or C').

Since two time-to-digital converters 12a and 12b are provided in the converter arrangement 10, the second time-to-digital converter 12b can be used for interpolation. For this, however, the time windows A', B' and C' are shifted compared to the feeding of the signal S. This can either take place in that the periodically recurring time windows A, B', C' are time-shifted by $\Delta T$ compared to the time windows A, B and C. In that way, a relation between the time windows A', B' and C' of the second time-to-digital converter 12b changes compared to a relation of the time window A, B and C of the first time-to-digital converter 12a to the signal S.

When, as illustrated herein, the signal S is fed (is fed simultaneously) to the two time-to-digital converters 12a and 12b (wherein the periodically recurring signal of the time-to-digital converter 12b is started delayed by $\Delta T$), the first time-to-digital converter 12a will determine that the signal S is included in the time window B, and the second time-to-digital converter 12b will determine that the signal S is included in the time window A'. Merely from the information of the time-to-digital converter 12a it can only be determined that the runtime of the signal S (runtime between emitting the excitation signal and receiving the response signal S by means of the receiver 18) has to be somewhere between the runtime defined by the duration A and the runtime defined by A B. When consulting the information generated by the time converter 12b, it can also be determined that the signal runtime is, at maximum, the duration of the time window A'+$\Delta T$.

When it is assumed, according to embodiments, that the duration A, B and C as well as the duration A', B' and C' are all identical and $\Delta T$ is, for example, 0.5A, the response signal will be received somewhere between 1.0 to 1.5 times of the duration.

As a result, temporal interpolation by the time offset $\Delta T$ is possible.

In the n TDCs running in parallel, it is essential that the same are started or stopped in a temporally delayed manner, so that temporal interpolation between the same is possible. For a TDC resolution of $\Delta T_{TDC}$, the n TDCs each have to be started or stopped delayed from one another by a certain temporal delay $\Delta T$ $$\Delta T = \frac{\Delta T_{TDC}}{n}. \quad (1)$$

Here, the sum of all delays of the TDCs corresponds exactly to the resolution of the individual TDC, such that n times the temporal resolution results. The exact temporal position can be detected based on the change between two TDCs, wherein one TDC has just counted a clock and the next TDC has just not counted that clock anymore. In that way, the fine time resolution can be determined at the transition.

As already indicated above, there are two options of operating the TDC structure 10 and the delay $\Delta T$. On the one hand, all TDCs can be started together and stopped in a delayed manner, or the same can be started in a delayed manner and stopped together. Which of the methods is appropriate can be decisive, depending on the application, however, it plays no part for the accuracy of the temporal resolution.

Figure 2A:
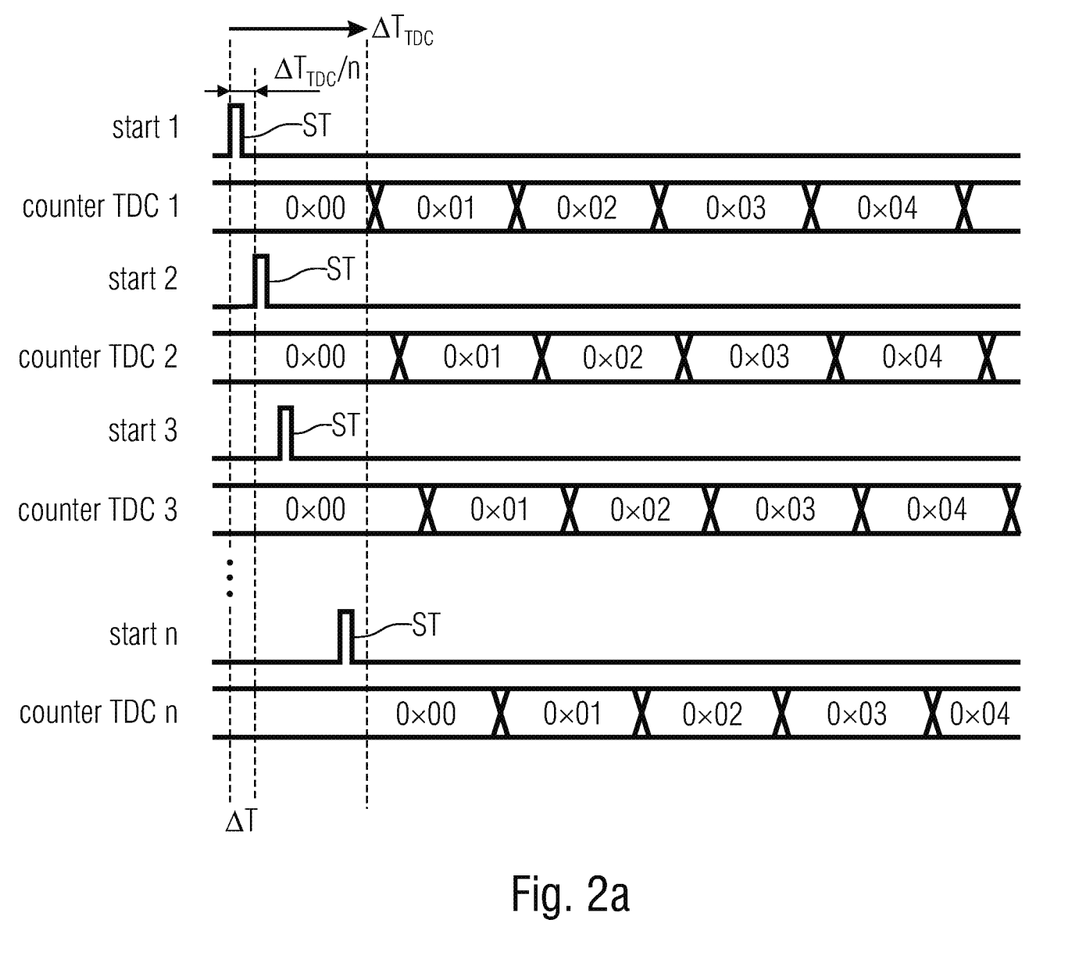
FIG. 2a is a schematic illustration for illustrating the start timing at a delayed start according to embodiments.
Figure 2B:
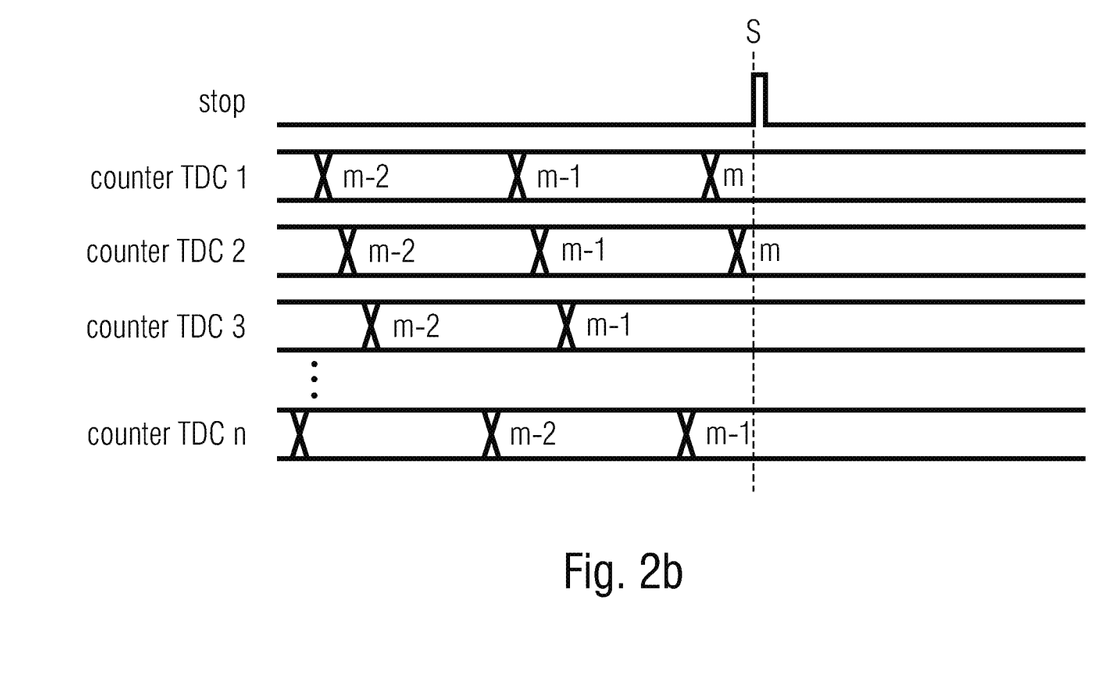
FIG. 2b is a schematic illustration of the stop timing at a delayed start according to embodiments.

With reference to FIG. 2a, an embodiment with delayed start and common stop of the TDC will be discussed (comparable to the simplified variation of FIG. 1). FIG. 2a shows the periodic time windows 0x00 to 0x04 for n different time-to-digital converters. The same are each temporally offset by $\Delta T = \Delta T_{TDC}/n$. The runtime of each time window is identical, namely $\Delta T_{TDC}$. All time-to-digital converters are started in a delayed manner by the start signal ST. In FIG. 2b, the stop signal for the respective time-to-digital converters is illustrated associated to the individual time windows.

For this variation, the n TDCs are each started delayed by the time $\Delta T$ according to (1), wherein the start of the first TDC corresponds to the intended start signal ST. All TDCs are stopped together with the intended stop signal S. The resulting combinations of the fine time interpolations will be illustrated in the following table.

| | Fine Step $k_{fine}$ | | | | | |
|---|---|---|---|---|---|---|
| | 0 | 1 | 2 | 3 | 4 | ... n − 1 |
| TDC 1 | m | m | m | m | m | m |
| TDC 2 | m − 1 | m | m | m | m | m |
| TDC 3 | m − 1 | m − 1 | m | m | m | m |
| TDC 4 | m − 1 | m − 1 | m − 1 | m | m | m |
| TDC 5 | m − 1 | m − 1 | m − 1 | m − 1 | m | m |
| ... | | | | | | ... |
| TDC n | m − 1 | m − 1 | m − 1 | m − 1 | m − 1 | ... m |

The same illustrates the course of the TDC counter for a delayed start. Thus, the exact runtime t for (2) can be calculated:

$$t = \left[m + \frac{k_{fine}}{n}\right] \cdot \Delta T_{TDC} \quad (2)$$

As already indicated, $\Delta T_{TDC}$ is the temporal resolution, n the number of used time-to-digital converters, m the number of time windows counted by means of the first time-to-digital converter and $k_{fine}$, the position in the above illustrated table where the respective transition has taken place during the count.

Thus, in this embodiment, it is assumed that the start of the n TDCs takes place in a delayed manner, as illustrated schematically in the timing diagram of FIG. 2a. Therefore, each TDC receives its own start signal. The start signals each start the TDC with a counter setting of 0, which is incremented by 1 after $\Delta T_{TDC}$. By the delayed start, part of the TDCs lag behind by one counter reading at any time as illustrated in FIG. 2b. Based on the number of TDC that have not reached the counter reading of the first TDC, temporal interpolation can take place and, hence increased resolution can be obtained.

Figure 3A:
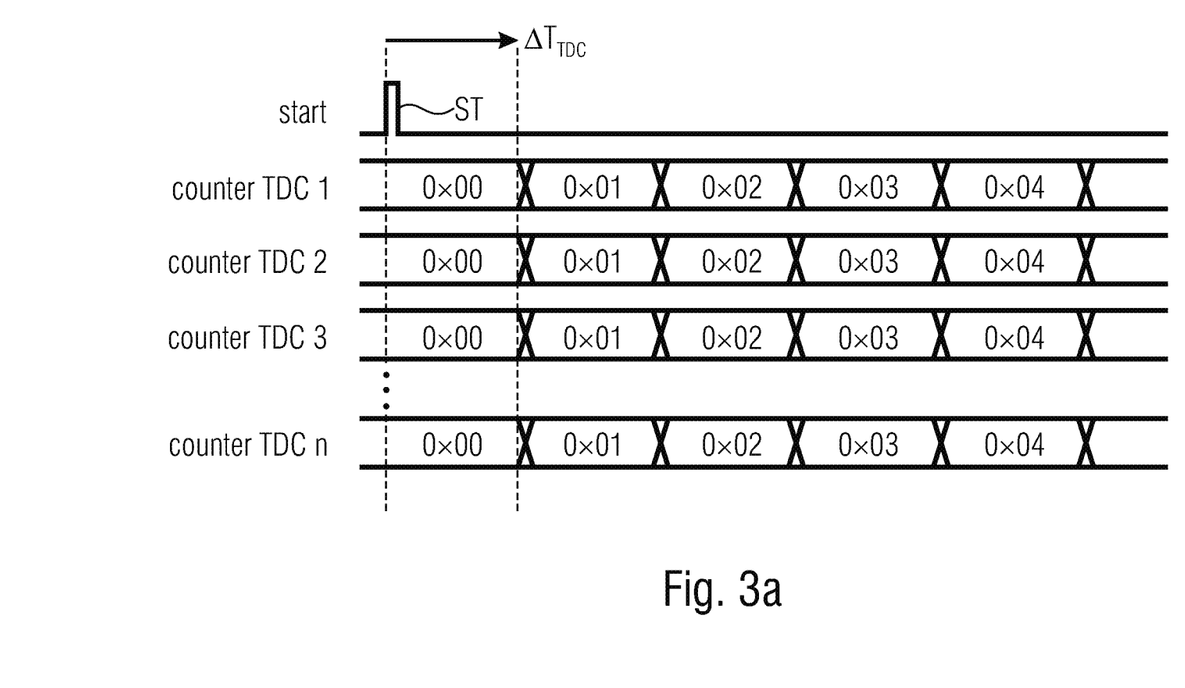
FIG. 3a is a schematic illustration of a start timing at a delayed stop according to further embodiments.
Figure 3B:
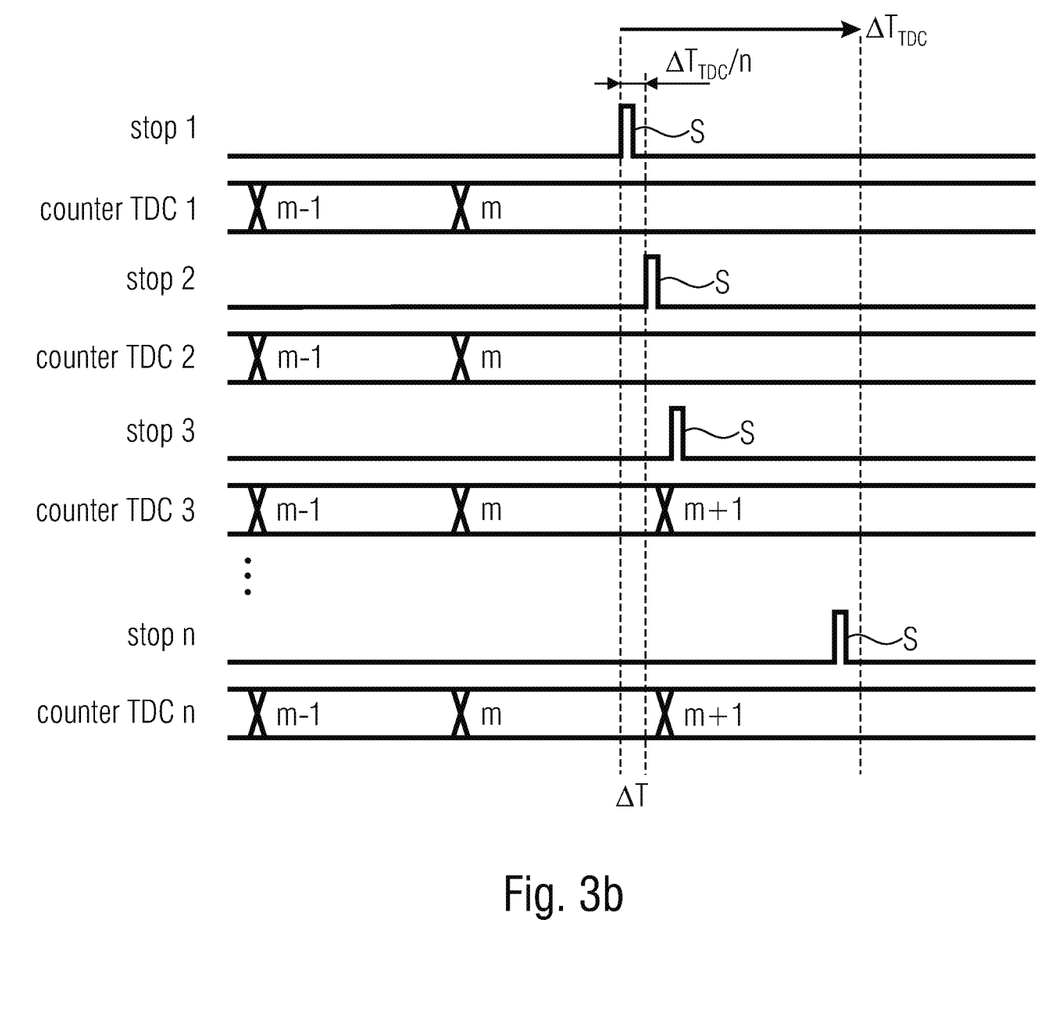
FIG. 3b is a schematic illustration of the stop timing at a delayed stop according to further embodiments.

The same principle can be obtained with a common start and delayed stop of the TDCs. The timing diagram for a delayed start for the start signal is illustrated in FIG. 3a, while the timing diagram for the delayed stop is illustrated in FIG. 3b. As shown based on the timing diagram of FIG. 3a, all TDCs are started simultaneously by the start signal S and incremented together beginning with the counter reading 0. In order to also realize temporal interpolation with this constellation, the TDCs are stopped delayed by ΔT (cf. formula 1), This is shown in FIG. 3b based on the delayed stop signals S. Here, the stop signal S of the first TDC corresponds to the true stop signal (feeding time of the signal S). Based on the number of TDCs having incremented a counter reading, temporal interpolation can take place, as will be discussed below. Again, it is the case that some TDCs count the number of time windows m as it has taken place at least between start ST and stop S. In the variation illustrated herein, this is at least the TDC 1 as shown by the following table.

| | Fine Step $k_{fine}$ | | | | | |
|---|---|---|---|---|---|---|
| | 0 | 1 | 2 | 3 | 4 | ... n − 1 |
| TDC 1 | m | m | m | m | m | m |
| TDC 2 | m + 1 | m | m | m | m | m |
| TDC 3 | m + 1 | m + 1 | m | m | m | m |
| TDC 4 | m + 1 | m + 1 | m + 1 | m | m | m |
| TDC 5 | m + 1 | m + 1 | m + 1 | m + 1 | m | m |
| ... | | | | | | ... |
| TDC n | m + 1 | m + 1 | m + 1 | m + 1 | m + 1 | ... m |

Based on the transition between a TDC counting m and a TDC counting m+1 (i.e. a different number of counted time windows), the fine step can be determined. With this fine step $k_{fine}$, the runtime can be determined exactly as follows:

$$t = \left[m + 1 - \frac{k_{fine}}{n}\right] \cdot \Delta T_{TDC} \quad (3)$$

In summary, it has to be stated that for this second variation the n TDCs are all started together with the intended start signal ST, wherein the intended stop signal S of the first TDC is stopped directly and the further TDCs are stopped delayed by ΔT (cf. formula 1). By this delay, interpolation can be obtained.

Here, it should be noted that delays existing anyway due to the signal line or by artificially introduced delays for the stop signal S or the start signal ST have no influence on the discussed method, but only represent a shift or a constant delay.

Figure 4:
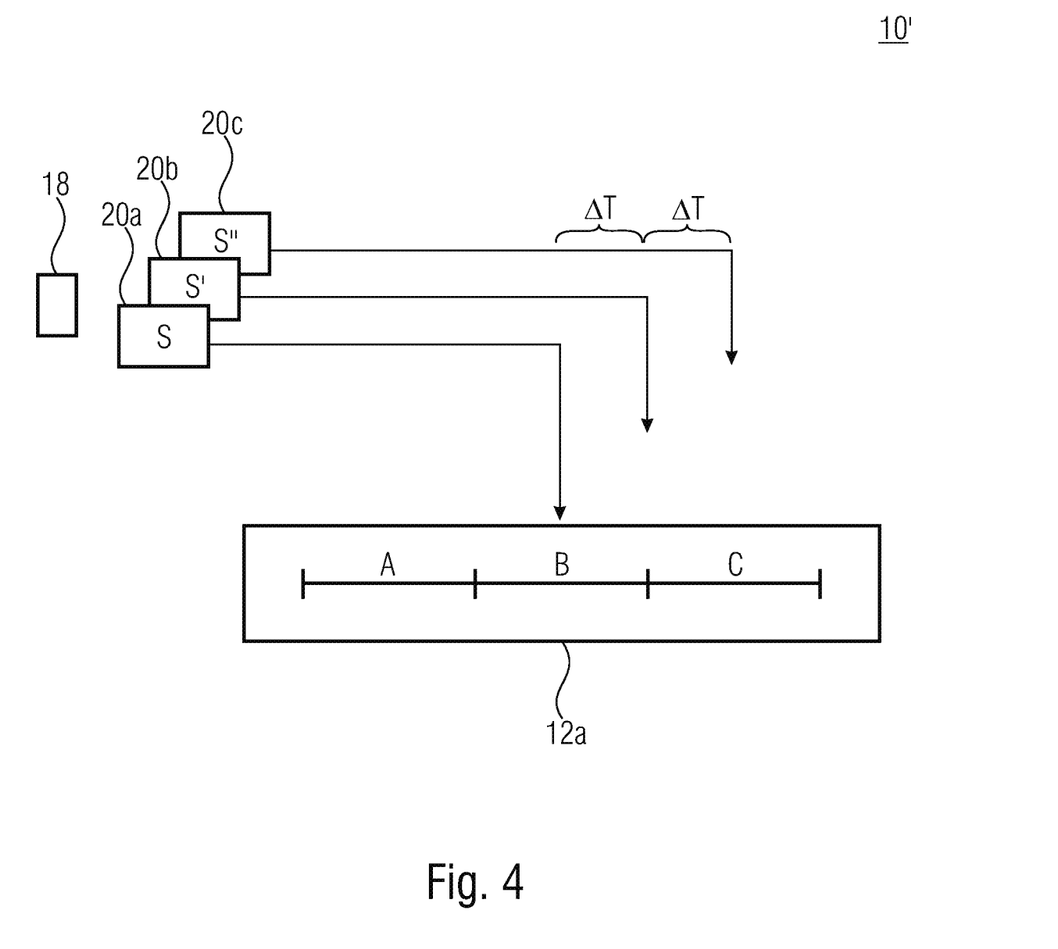
FIG. 4 is a schematic block diagram of a time-to-digital converter arrangement according to another basic embodiment.

With reference to FIG. 4, a further variation will be explained. Here, a TDC 12a of the arrangement 10' is used. By means of a sensor 18, the signal S is determined at different times (cf. S' or S") in the individual frames 20a, 20b and 20c. It is assumed that the measured runtime, i.e. the distance between start ST and stop S does not change during the n frames 20a, 20b and 20c.

There are again two variations for inserting a respective delay into the evaluation. According to a first variation, the signal S (of, frame 20a) can be fed directly to the time-to-digital converter 12a, here during the time window B, while the signal S' of the second frame 20b is fed to the same converter offset by ΔT and the signal S" of the frame 20c is fed offset by a further ΔT, i.e. 2ΔT compared to the signal S. Here, offset means with respect to the respective frame when sequential frames 20a, 20b and 20c are assumed. Also, the signals S, S', and S" are not identical, but correspond to each other, i.e. such that S is the response signal to ST, while S' is the response signal to ST', and S" is the response signal to ST". This offset feeding represents the same principle as the embodiment with the delayed stop, cf. FIGS. 3a and 3b, such that the above-discussed evaluation principle can be applied.

According to a further variation, obviously, the start can be delayed per frame 20a, 20b and 20c, such that the time for digital converter 12a then has differently shifted frames. Here. the evaluation can be compared to the embodiment of FIGS. 2a and 2b.

Therefore, with this embodiment of FIG. 4, interpolation is possible by a delay by $\Delta T = \Delta T_{roc}/n$ across several frames, wherein n is the number of added frames.

In the following, different variations or embodiments of the sensor 18 or, all in all, the field of application of the above embodiments will be discussed. Apart from the stated embodiment of an integrated CMOS sensor, the presented method can also be realized by means of silicon photo multipliers (SIPM) or avalanche diodes, integrated or distributed with discrete components, or as a pure computer program. The method can also be used in 3D hybrid integration by means of wafer-to-wafer, chip-to-wafer or chip-to-chip bonding with associated readout combinatorics and in different technologies like CMOS or III-V semiconductors of different structural sizes. Apart from the stated applications in the automotive field, the method can also be applied to further fields of usage, such as medical technology, analytics or avionics.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps may be performed by a hardware apparatus (or using a hardware apparatus), such as a microprocessor, a programmable computer or an electronic circuit. In some embodiments, some or several of the most important method steps may be performed by such an apparatus.

An inventively encoded signal, such as an audio signal or a video signal or a transport current signal can be stored on a digital memory medium or can be transferred on a transfer medium, such as a wireless transfer medium or a wired transfer medium, such as the internet.

The inventive encoded audio signal can be stored on a digital memory medium or can be transferred on a transfer medium, such as a wireless transfer medium or a wired transfer medium, for example, the Internet.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may, for example, be stored on a machine readable carrier.

Other embodiments comprise the computer program for performing one of the methods described herein, wherein the computer program is stored on a machine readable barrier.

In other words, an embodiment of the inventive method is, therefore, a computer program comprising a program code for performing one of the methods described herein, when the computer program runs on a computer.

A further embodiment of the inventive method is, therefore, a data carrier (or a digital storage medium or a computer-readable medium) comprising, recorded thereon, the computer program for performing one of the methods described herein. The data carrier, the digital storage medium, or the computer-readable medium are typically tangible or non-volatile.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment in accordance with the invention includes an apparatus or a system configured to transmit a computer program for performing at least one of the methods described herein to a receiver. The transmission may be electronic or optical, for example. The receiver may be a computer, a mobile device, a memory device or a similar device, for example. The apparatus or the system may include a file server for transmitting the computer program to the receiver, for example.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC.

The apparatuses described herein may be implemented, for example, by using a hardware apparatus or by using a computer or by using a combination of a hardware apparatus and a computer.

The apparatuses described herein or any components of the apparatuses described herein may be implemented at least partly in hardware and/or software (computer program).

The methods described herein may be implemented, for example, by using a hardware apparatus or by using a computer or by using a combination of a hardware apparatus and a computer.

The methods described herein or any components of the methods described herein may be performed at least partly by hardware and/or by software.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A Time-to-digital converter arrangement, comprising:
a first time-to-digital converter configured to determine an existence or nonexistence of an event in a recurring first measurement window;
a second time-to-digital converter configured to determine the existence or the nonexistence of the event in a recurring second measurement window,
wherein a temporal relation of the second measurement window with respect to detecting the event is time-shifted by a first offset compared to a temporal relation of the first measurement window with respect to detecting the event,
wherein a runtime is to be calculated based on the following formula:

$$t = \left[m + \frac{k_{fine}}{n}\right] \cdot \Delta T_{TDC}, \text{ or}$$

further comprising a calculating unit configured to multiply the number of measurement windows of the first time-to-digital converter with the duration per measurement window and to add the first offset when the number of counted measurement windows differs between the first and second time-to-digital converter to acquire a runtime, or to multiply the number of measurement windows of the first time-to-digital converter with the duration per measurement window and to add the first offset and a second offset when the number of measurement windows of the third time-to-digital converter differs from the second time-to-digital converter to acquire a runtime, or
wherein the second measurement window is started shifted by the first offset compared to the first measurement window or wherein all measurement windows are started shifted by the respective offset and an incremental shift takes place by means of their respective offset or
wherein feeding the event to the second time-to-digital converter is shifted by a first offset and wherein a shifting takes place incrementally or wherein their runtime is calculated based on the following formula:

$$t = \left[m + 1 - \frac{k_{fine}}{n}\right] \cdot \Delta T_{TDC}$$

wherein t is the runtime, m is a number of counted time windows up to a stop signal, n is a number of time-to-digital converters, $k_{fine}$ is a number of counted fine steps and $\Delta T_{TDC}$ is the duration of a time window.

2. The time-to-digital converter arrangement according to claim 1 comprising at least a third time-to-digital converter configured to determine the existence or nonexistence of the event in a recurring third measurement window, wherein a temporal relation of the third measurement window with respect to detecting the event is time-shifted by a second offset compared to a temporal relation of the second measurement window with respect to detecting the event, and time-shifted by the first and the second offset compared to a temporal relation of the first measurement window with respect to detecting the event.

3. The time-to-digital converter arrangement according to claim 2, wherein the first and the second offset or all of the offsets are the same.

4. The time-to-digital converter according to claim 2, wherein the second and the third time-to-digital converter is used for interpolating the measurement windows; and
wherein interpolation takes place by means of the second converter when the number of measurement windows differs between the first and the second time-to-digital converter and wherein interpolation takes place by means of the third converter when the number of measurement windows differs between the second and the third time-to-digital converter.

5. The time-to-digital converter arrangement according to claim 2, wherein feeding the event to the third time-to-digital converter is shifted by the first and second offset.

6. The time-to-digital converter arrangement according to claim 1, wherein the first and the second measurement window and the first, the second and the third measurement window and wherein all of the measurement windows are of the same length.

7. The time-to-digital converter arrangement according to claim 1, wherein the first and the second time-to-digital converter or each time-to-digital converter is connected to a counter configured to count the number of time windows up to the existence or the no-longer-existence of the event per converter.

8. The time-to-digital converter arrangement according to claim 7, wherein the counter is configured to count the number of time windows between start and end, wherein the end is defined by the existence or no-longer-existence of the event.

9. The time-to-digital converter arrangement according to claim 1, wherein an interpolated measurement value is acquired when the number of counted measurement windows between the first and the second time-to-digital converter, between the second and the third time-to-digital converter or between increments of successive time-to-digital converters is different.

10. The time-to-digital converter arrangement according to claim 1, wherein the second time-to-digital converter is used for interpolating the measurement windows; and
wherein interpolation takes place when the number of counted measurement windows differs between the first and the second time-to-digital converter.

11. The time-to-digital converter arrangement according to claim 1, wherein the event is fed to every time-to-digital converter.

12. The time-to-digital converter arrangement according to claim 1, wherein all time-to-digital converters or the first and the second time-to-digital converters are started simultaneously.

13. A time-to-digital Time to digital converter arrangement comprising:
a first time-to-digital converter configured to determine an existence or nonexistence of an event for a first frame in a recurring first measurement window and an existence or nonexistence of the respective event for at least a second frame in a recurring second measurement window;
wherein a temporal relation of the second measurement window with respect to detecting the respective event is time-shifted by a first offset compared to a temporal relation of the first measurement window with respect to detecting the event,
wherein a runtime is to be calculated based on the following formula:

$$t = \left[m + \frac{k_{fine}}{n}\right] \cdot \Delta T_{TDC}, \text{ or}$$

further comprising a calculating unit configured to multiply the number of measurement windows of the first time-to-digital converter with the duration per measurement window and to add the first offset when the number of counted measurement windows differs between the first and second time-to-digital converter to acquire a runtime, or to multiply the number of measurement windows of the first time-to-digital converter with the duration per measurement window and to add the first offset and a second offset when the number of measurement windows of the third time-to-digital converter differs from the second time-to-digital converter to acquire a runtime, or
wherein the second measurement window is started shifted by the first offset compared to the first measurement window or wherein all measurement windows are started shifted by the respective offset and an incremental shift takes place by means of their respective offset or
wherein feeding the event to the second time-to-digital converter is shifted by a first offset and wherein a shifting takes place incrementally or wherein their runtime is calculated based on the following formula:

$$t = \left[m + 1 - \frac{k_{fine}}{n}\right] \cdot \Delta T_{TDC}$$

wherein t is the runtime, m is a number of counted time windows up to a stop signal, n is a number of time-to-digital converters, $k_{fine}$ is a number of counted fine steps and $\Delta T_{TDC}$ is the duration of a time window.

14. The time-to-digital converter arrangement according to claim 13, wherein the second frame follows the first frame in time.

15. The time-to-digital converter arrangement according to claim 13, wherein the first time-to-digital converter is configured to determine an existence or nonexistence of a further respective event for at least a third frame in a recurring third measurement window.

16. A measurement system, comprising:
a time-to-digital converter arrangement, comprising:
a first time-to-digital converter configured to determine an existence or nonexistence of an event in a recurring first measurement window;
a second time-to-digital converter configured to determine the existence or the nonexistence of the event in a recurring second measurement window,
wherein a temporal relation of the second measurement window with respect to detecting the event is time-shifted by a first offset compared to a temporal relation of the first measurement window with respect to detecting the event, as well as a CMOS sensor, a silicon photo multiplier, an avalanche diode or another detector for detecting an event, wherein a runtime is to be calculated based on the following formula:

$$t = \left[m + \frac{k_{fine}}{n}\right] \cdot \Delta T_{TDC}, \text{ or}$$

further comprising a calculating unit configured to multiply the number of measurement windows of the first time-to-digital converter with the duration per measurement window and to add the first offset when the number of counted measurement windows differs between the first and second time-to-digital converter to acquire a runtime, or to multiply the number of measurement windows of the first time-to-digital converter with the duration per measurement window and to add the first offset and a second offset when the number of measurement windows of the third time-to-digital converter differs from the second time-to-digital converter to acquire a runtime, or wherein the second measurement window is started shifted by the first offset compared to the first measurement window or wherein all measurement windows are started shifted by the respective offset and an incremental shift takes place by means of their respective offset or wherein feeding the event to the second time-to-digital converter is shifted by a first offset and wherein a shifting takes place incrementally or wherein their runtime is calculated based on the following formula:

$$t = \left[m + 1 - \frac{k_{fine}}{n}\right] \cdot \Delta T_{TDC}$$

wherein t is the runtime, m is a number of counted time windows up to a stop signal, n is a number of time-to-digital converters, $k_{fine}$ is a number of counted fine steps and $\Delta T_{TDC}$ is the duration of a time window.

17. A method for time-to-digital conversion, comprising:
determining an existence or nonexistence of an event associated to a recurring first measurement window by means of a first time-to-digital converter;
determining the existence or nonexistence of the event associated to a second recurring measurement window by means of a second time-to-digital converter,
wherein a temporal relation of the second measurement window with respect to detecting the event is time-shifted by a first offset compared to a temporal relation of the first measurement window with respect to detecting the event
wherein a runtime is to be calculated based on the following formula:

$$t = \left[m + \frac{k_{fine}}{n}\right] \cdot \Delta T_{TDC}, \text{ or}$$

further comprising a calculating unit configured to multiply the number of measurement windows of the first time-to-digital converter with the duration per measurement window and to add the first offset when the number of counted measurement windows differs between the first and second time-to-digital converter to acquire a runtime, or to multiply the number of measurement windows of the first time-to-digital converter with the duration per measurement window and to add the first offset and a second offset when the number of measurement windows of the third time-to-digital converter differs from the second time-to-digital converter to acquire a runtime, or wherein the second measurement window is started shifted by the first offset compared to the first measurement window or wherein all measurement windows are started shifted by the respective offset and an incremental shift takes place by means of their respective offset or wherein feeding the event to the second time-to-digital converter is shifted by a first offset and wherein a shifting takes place incrementally or wherein their runtime is calculated based on the following formula:

$$t = \left[m + 1 - \frac{k_{fine}}{n}\right] \cdot \Delta T_{TDC}$$

wherein t is the runtime, m is a number of counted time windows up to a stop signal, n is a number of time-to-digital converters, $k_{fine}$ is a number of counted fine steps and $\Delta T_{TDC}$ is the duration of a time window.

18. A method for time-to-digital conversion, comprising:
determining, by means of a first time-to-digital converter, an existence or nonexistence of an event for a first frame in a recurring first measurement window; and
determining, by means of a first time-to-digital converter, an existence or nonexistence of the respective event for at least a second frame in a recurring second measurement window;
wherein a temporal relation of the second measurement window with respect to detecting the respective event is time-shifted by a first offset compared to a temporal relation of the first measurement window with respect to detecting the event wherein a runtime is to be calculated based on the following formula:

$$t = \left[m + \frac{k_{fine}}{n}\right] \cdot \Delta T_{TDC}; \text{ or}$$

further comprising a calculating unit configured to multiply the number of measurement windows of the first time-to-digital converter with the duration per measurement window and to add the first offset when the number of counted measurement windows differs between the first and second time-to-digital converter to acquire the runtime, or to multiply the number of measurement windows of the first time-to-digital converter with the duration per measurement window and to add the first offset and a second offset when the number of measurement windows of the third time-to-digital converter differs from the second time-to-digital converter to acquire the runtime; or wherein the second measurement window is started shifted by the first offset compared to the first measurement window or wherein all measurement windows are started shifted by the respective offset; and wherein an incremental shift takes place by means of their respective offset; or wherein feeding the event to the second time-to-digital converter is shifted by the first offset and wherein a shifting takes place incrementally; or wherein the runtime is calculated based on the following formula $$t = \left[m + 1 - \frac{k_{fine}}{n}\right] \cdot \Delta T_{TDC},$$

wherein t is the runtime, m is a number of counted time windows up to a stop signal, n is a number of time-to-digital converters, $k_{fine}$ is a number of counted fine steps and $\Delta T_{TDC}$ is the duration of a time window.

19. A non-transitory digital storage medium having a computer program stored thereon to perform the method for time-to-digital conversion, the method comprising:
determining an existence or nonexistence of an event associated to a recurring first measurement window by means of a first time-to-digital converter;
determining the existence or nonexistence of the event associated to a second recurring measurement window by means of a second time-to-digital converter,
wherein a temporal relation of the second measurement window with respect to detecting the event is time-shifted by a first offset compared to a temporal relation of the first measurement window with respect to detecting the event,
when said computer program is run by a computer, wherein a runtime is to be calculated based on the following formula:

$$t = \left[m + \frac{k_{fine}}{n}\right] \cdot \Delta T_{TDC}, \text{ or}$$

further comprising a calculating unit configured to multiply the number of measurement windows of the first time-to-digital converter with the duration per measurement window and to add the first offset when the number of counted measurement windows differs between the first and second time-to-digital converter to acquire a runtime, or to multiply the number of measurement windows of the first time-to-digital converter with the duration per measurement window and to add the first offset and a second offset when the number of measurement windows of the third time-to-digital converter differs from the second time-to-digital converter to acquire a runtime, or
wherein the second measurement window is started shifted by the first offset compared to the first measurement window or wherein all measurement windows are started shifted by the respective offset and an incremental shift takes place by means of their respective offset or
wherein feeding the event to the second time-to-digital converter is shifted by a first offset and wherein a shifting takes place incrementally or wherein their runtime is calculated based on the following formula:

$$t = \left[m + 1 - \frac{k_{fine}}{n}\right] \cdot \Delta T_{TDC}$$

wherein t is the runtime, m is a number of counted time windows up to a stop signal, n is a number of time-to-digital converters, $k_{fine}$ is a number of counted fine steps and $\Delta T_{TDC}$ is the duration of a time window.

20. A non-transitory digital storage medium having a computer program stored thereon to perform the method for time-to-digital conversion, the method comprising:
determining, by means of a first time-to-digital converter, an existence or nonexistence of an event for a first frame in a recurring first measurement window; and
determining, by means of a first time-to-digital converter, an existence or nonexistence of the respective event for at least a second frame in a recurring second measurement window;
wherein a temporal relation of the second measurement window with respect to detecting the respective event is time-shifted by a first offset compared to a temporal relation of the first measurement window with respect to detecting the event,
when said computer program is run by a computer, wherein a runtime is to be calculated based on the following formula:

$$t = \left[m + \frac{k_{fine}}{n}\right] \cdot \Delta T_{TDC}, \text{ or}$$

further comprising a calculating unit configured to multiply the number of measurement windows of the first time-to-digital converter with the duration per measurement window and to add the first offset when the number of counted measurement windows differs between the first and second time-to-digital converter to acquire a runtime, or to multiply the number of measurement windows of the first time-to-digital converter with the duration per measurement window and to add the first offset and a second offset when the number of measurement windows of the third time-to-digital converter differs from the second time-to-digital converter to acquire a runtime, or
wherein the second measurement window is started shifted by the first offset compared to the first measurement window or wherein all measurement windows are started shifted by the respective offset and an incremental shift takes place by means of their respective offset or
wherein feeding the event to the second time-to-digital converter is shifted by a first offset and wherein a shifting takes place incrementally or wherein their runtime is calculated based on the following formula:

$$t = \left[m + 1 - \frac{k_{fine}}{n}\right] \cdot \Delta T_{TDC}$$

wherein t is the runtime, m is a number of counted time windows up to a stop signal, n is a number of time-to-digital converters, $k_{fine}$ is a number of counted fine steps and $\Delta T_{TDC}$ is the duration of a time window.

* * * * *